United States Patent [19]
Orbach

[11] 3,940,564
[45] Feb. 24, 1976

[54] TIME DIVISION MULTIPLEX SYSTEM WITH CONFERENCE LINK

[75] Inventor: Shelomo Orbach, Haifa, Israel

[73] Assignee: Tadiran Israel Electronics Industries Ltd., Tel-Aviv, Israel

[22] Filed: Oct. 24, 1974

[21] Appl. No.: 517,533

[30] Foreign Application Priority Data
Oct. 29, 1973   Israel.................................. 43516

[52] U.S. Cl. ........................ 179/15 AT; 179/18 BC
[51] Int. Cl.² ......................................... H04M 3/56
[58] Field of Search...... 179/15 AT, 15 AQ, 15 BY, 179/18 BC, 18 J

[56] References Cited
UNITED STATES PATENTS

| | | | |
|---|---|---|---|
| 3,171,896 | 3/1965 | Bartlett.......................... | 179/18 BC |
| 3,274,342 | 9/1966 | Brightman...................... | 179/18 BC |
| 3,617,643 | 11/1971 | Toy................................ | 179/15 AQ |
| 3,748,394 | 7/1973 | Thomas.......................... | 179/15 AT |

*Primary Examiner*—Thomas W. Brown
*Attorney, Agent, or Firm*—Theodore C. Jay, Jr.; Ralph W. Burnnet

[57] ABSTRACT

A time division multiplex system is provided with a conference link to a common transmission highway. The conference link includes a plurality of incoming conference lines with in-gates disposed therein, and a plurality of outgoing conference lines with respective out-gates disposed therein. A common control containing a cyclic memory controls the in-gates for sequentially connecting the incoming conference lines to the common transmission highway during specific time slots, and controls the out-gates to connect an outgoing conference line to the common highway during a specific time slot to establish the conference connection. Each outgoing conference line is connected to a sample and hold circuit for reconstruction of the sampled signal transmitted thereto from the transmission highway, and thereafter to a common adder before being coupled to the incoming lines of the conference link.

An operator's console is provided from which the conference connections are established. Override means are controlled at the console to enable the operator to gain access to the common transmission highway and override the ingates of the subscriber links without disconnecting the subscriber links.

7 Claims, 8 Drawing Figures

TIME DIVISION MULTIPLEX SYSTEM WITH CONFERENCE LINK

BACKGROUND OF THE INVENTION

The present invention relates to a time division multiplex system, and particularly to such a system useful as a private automatic branch telephone exchange.

At the present time there is an increasing demand by administrative, business, and other types of organizations for private automatic branch exchanges to provide efficient means of internal communication as well as access to public telephone networks. The exchanges are expected to accommodate a wide-range of service classes including special features required by the customer. Substantial progress in the field of private branch exchanges (PBX's) has been attained, the trend being towards automatic exchanges (PABX's) which allow direct internal and outgoing dialing, requiring the operator to deal only with incoming calls and special services.

A PABX is characterized by the organization of the control and switching network. The control may be either step-by-step, with direct set-up of calls according to subscriber's dialing; or by common-control, where the dialed number is stored and the call process according to the classes of services available between the calling and called subscribers.

The control section of a modern exchange is usually made of solid-state electronic components. The switching network of the modern PABX may, however be either electromechanical or electronic.

Electromechanical switching networks (relay, crossbar, etc.) all belong to a class called space division (SDS) networks, where the connections between subscribers are established by means of a physical link between them at the time of the call. Electronic switching networks, however, are of two classes, namely: space division (SDS) networks, utilizing stages of solid-state switching matrices; or time division (TDM) networks.

Time division switching is based on the technique of sampling a subscriber's speech and applying the samples in an appropriate time-slot to a common transmission highway. The sampling rate is always equal to or more than twice the highest frequency in the speech frequency band. Connections between two subscribers are established by opening their respective gates to the highway at the proper time-slot. The sampled speech of each subscriber is reconstructed to its analog form and is then received by the other subscribers.

The conventional time division multiplex system includes a plurality of subscriber links each for connection to a subscriber line, the subscriber links including a switching network having an in-gate and an out-gate for each subscriber line for accessing it to a common transmission highway, and a common control controlling the in-gate to sequentially connect a calling subscriber link to the common transmission highway in the time-slot of the calling subscriber.

In order to set up a conference link between subscribers in the conventional time division multiplex system, the conferees are directed through the switching network to an analog-multiport circuit in which the speech signals are combined. As each subscriber is connected to the multiport circuit, he receives the speech signals from all the conferees except his own. Adding of the signals may be accomplished either in space or time.

Adding the signals directly in a conventional time division multiplex exchange, by adding the appropriate time-slots, requires the writing of all the conferee addresses in each line of the memory. Such a system therefore requires a memory having a large capacity. In addition, if the switching network has sample and hold circuits, the conferee signals cannot be added in the same frame, as they will be distorted. That is, a sample and hold circuit, whether of the pulse lengthener type or of the box-car type, can receive information in one frame from only one source without causing distortion. Thus, such a system does not permit the use of sample and hold circuits, but rather requires the use of a more complicated speech reconstruction network.

In addition, the conventional time division multiplex system usually provides for operator's intercept by having the operator disconnect one of the connected lines and connect instead the operator's line. One disadvantage of this arrangement is that it requires an additional manipulation on the part of the operator. Another disadvantage is that the disconnected party may not be aware that the disconnection is only temporary and may therefore on-hook, i.e. hang-up.

SUMMARY OF THE INVENTION

According to one aspect of the invention, there is provided an improvement in a time division multiplex system wherein the system further includes a conference link to the common transmission highway, the conference link including a plurality of incoming conference lines and a plurality of outgoing conference lines for effecting at least one conference connection between a plurality of the subscriber lines, the switching network including an in-gate in each incoming conference line and an out-gate in each outgoing conference line for accessing the lines to the common transmission highway, the common control controlling the conference in-gates for sequentially connecting the incoming conference lines to the common transmission highway in specific time-slots allotted to them, and controlling the conference out-gates to connect a called outgoing conference line to the common transmission highway in the time-slot of a calling conferee subscriber.

According to a further feature of the invention, the system includes an operator's console having means controlled by the operator enabling only the operator to set-up the conference connection.

In the preferred embodiment of the invention described below, the common control includes a cyclic memory and means for recording therein the address of the called subscriber link or outgoing conference line in relation to the time-slot of the calling subscriber, and for recording therein the address of the calling subscriber link in relation to the time-slot of the called subscriber link or incoming conference line.

In the described embodiment, the in-gates of the subscriber links and of the incoming conference lines are sequentially opened in accordance with a fixed sequence of time-slots, but it is contemplated that these time-slots could be allotted on a floating basis.

According to another feature of the present invention, each outgoing conference line is connected to a sample and hold circuit for reconstructing the signal transmitted thereto from the common transmission highway through its respective out-gate. The outputs of the sample and hold circuits of all the outgoing conference lines are connected to the input of a common adder, the output of the adder being fed through a common low-pass filter to the incoming lines of the conference link. A second adder is provided for adding the operator's signal to the output of the low-pass filter before the signal is fed to the incoming lines of the conference link.

According to a further feature of the invention, the operator's console includes a conference switch manually actuatable by the operator to set-up a conference connection between a plurality of subscriber links and the conference link, a line switch for each of the incoming conference links and manually actuatable by the operator to enable the incoming conference line, and means controlled by the operator enabling the common control to connect a calling subscriber link to a selected incoming conference line.

According to another aspect of the invention, the system further includes an in-gate for providing access of the operator's line to the common transmission highway, and override means enabling the in-gate of the operator's line to override the in-gates of the subscriber links and the conference lines without actually disconnecting the latter.

According to another feature, the system further includes tone sources and in-gates for providing access thereof to the common transmission highway, said override means enabling the in-gates of the tone sources to override the in-gates of the subscriber links and of the conference lines, but not that of the operator's line.

In the preferred embodiment of the invention described below, the in-gates are maintained at different DC levels, the DC level of the subscriber links and of the conference lines being at one extreme value, that of the operator's line being at the opposite extreme value, and that of the tone sources being between the two extreme values.

Further features of the invention will be apparent from the description below.

BRIEF DESCRIPTION OF THE DRAWINGS

The invention is herein described, by way of example only, with reference to a preferred embodiment thereof illustrated in the drawings, wherein.

DETAILED DESCRIPTION OF THE PREFERRED EMBODIMENT

General System Arrangement

Figure 1:
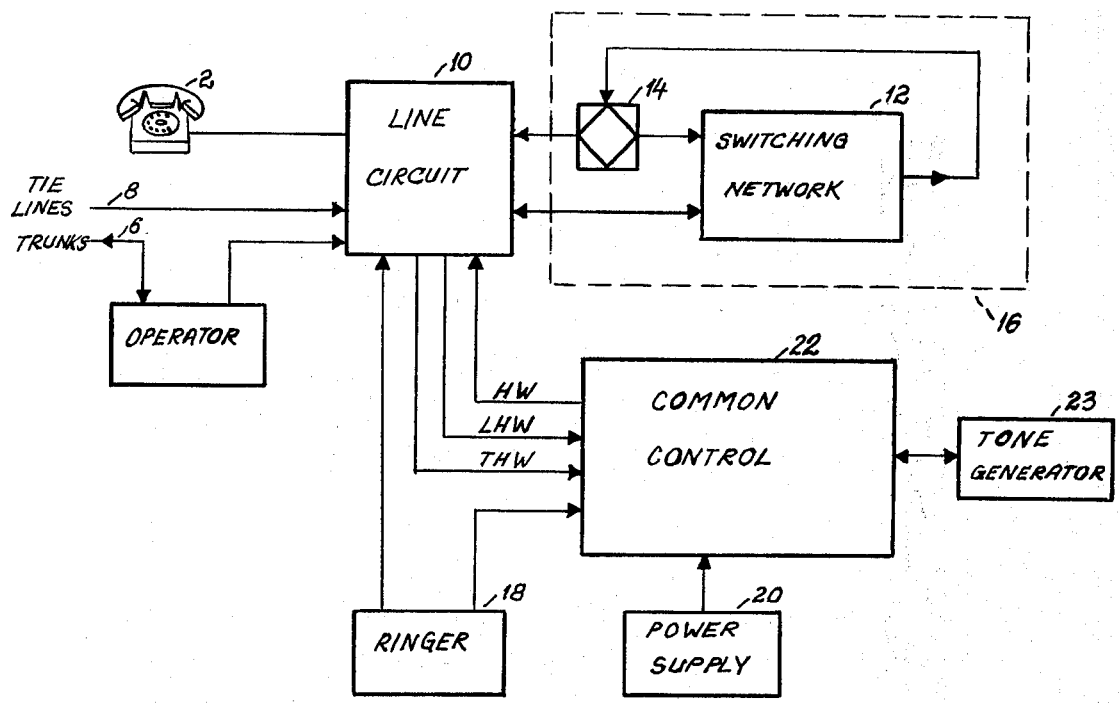
FIG. 1 is a block diagram of the time division multiplex system in accordance with the present invention.

The system illustrated in the drawings is a private automatic branch exchange (PABX) including a common control unidirectional time division multiplex switching arrangement. It uses a single highway HW for transmitting all the analog information (speech and signalling tones) within the system. A single highway is used in this case because of the small number of terminals within the system. As one example, the system may include the possibility for connecting 24 central battery subscriber terminals 2, including the operator terminal 4, plus four trunk line 6, and four tie-lines 8 to similar private automatic branch exchanges.

The line circuit 10 connects the terminals 2 to a switching network 12 via a hybrid circuit 14 which effects a 2-wire to 4-wire transformation. The hybrid circuit and the switching network in the standard subscriber's unit are commonly called a standard link, this link being indicated by the broken-line box 16 in FIG. 1. Two 2-wire subscribers are ties by connecting a loop of hybrid circuits.

The line circuit 10 supplies the direct current needed in the subscriber's set for signalling and for driving the subscriber's microphone. In addition, it connects the set to the ringer 18 supplied by a relatively high voltage from power supply 20. The line circuit also contains the signaling detectors (off-hook and dialing) which detect the foregoing conditions and produce a signal which is fed to the common control 22 via the LHW bus to control the tone generators 23. It further includes the transfer order detector which detects a transfer order (by the subscriber shorting one of the line wires to earth) which transfer order is also fed to the common control 22 via bus THW.

The common control 22 supplies all the timing information to the switching network 12, and also functionally supervises every terminal and every link of the telephone exchange.

Our co-pending U.S. Pat. Application discloses an arrangement for a subscriber unit, including a specific line circuit 10 and standard link 16, which may be used in the system illustrated in FIG. 1.

Common Control and Switching Network

Figure 2:
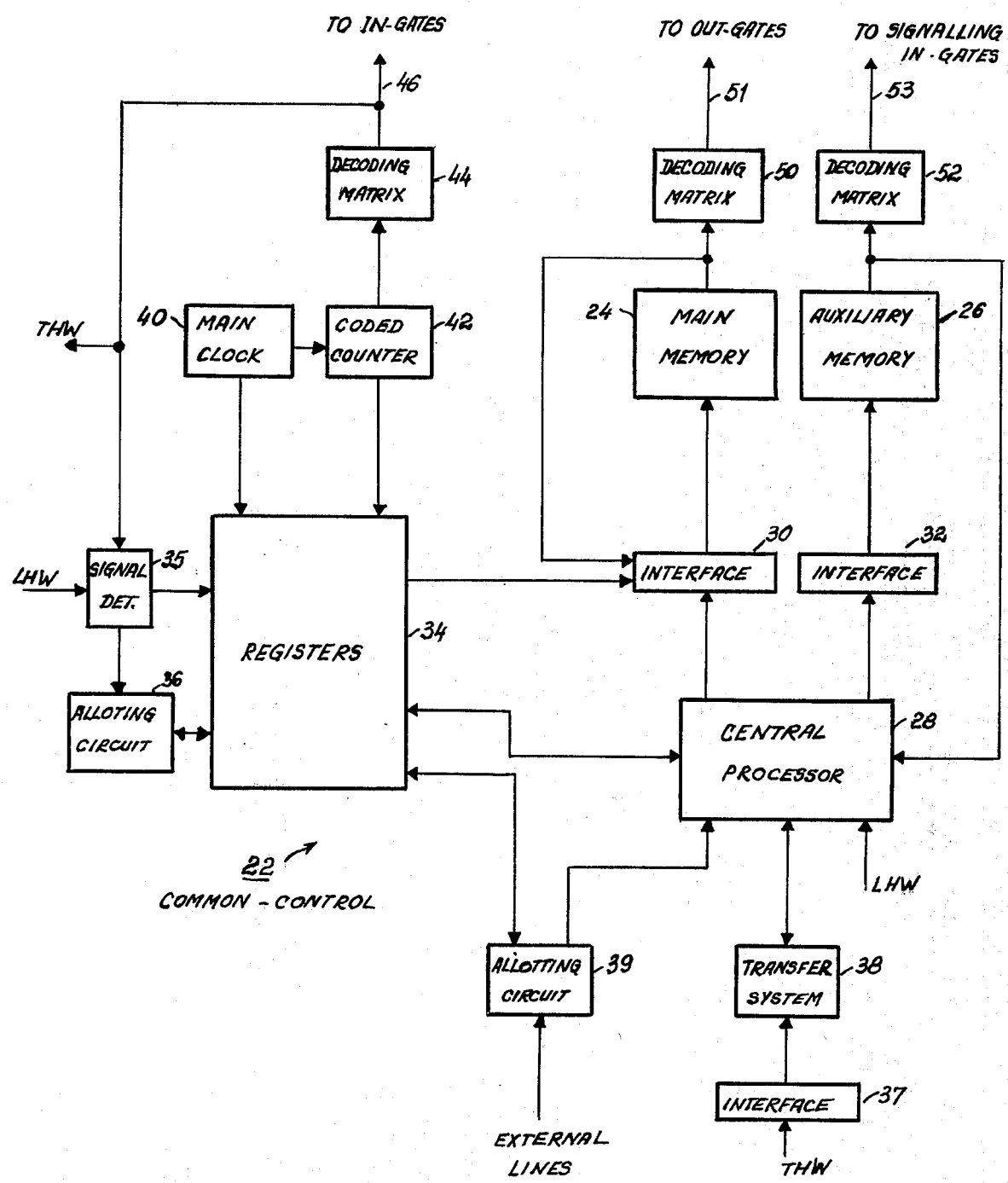
FIG. 2 is a block diagram illustrating the common control in the system of FIG. 1.

FIG. 2 illustrates, in block diagram form, one common control arrangement which may be used in the system of FIG. 1.

The common control illustrated in FIG. 2 comprises a cyclic memory divided into two parts, namely, a main memory 24 which contains the information about the connections between terminals, and an auxiliary memory 26 which contains the information concerning the status of the terminals. Both the main memory 24 and the auxiliary memory 26 contain a row (word) for each terminal. In addition, the number of rows in the memory is greater than the number of terminals. The redundancy of rows in the memory permits the organization of special terminals (preferred, blocked, tie-line, trunk and conference links) into defined groups for easy identification, while at the same time simplifying the logic organization. In addition, it provides capacity for temporary storage if and when needed.

A serial type of memory is preferably used rather than a parallel one, primarily because of economic considerations. Many types of memories are known which can be used, a preferred example being the LSI MOS shift register memory.

The storage and read-out of the information from the memory is controlled by a central processor 28 via an interface 30 to the main memory 24 and an interface 32 to the auxiliary memory 26. The central processor 28 also receives the terminal state information from auxiliary memory 26 and updates it according to the incoming information.

The information concerning the state of the terminals originates at the respective terminal line circuits 10 mentioned earlier, producing the offhook and dialing signals on bus LHW and the transfer signals on bus THW. The dialing and off-hook signals from the LHW bus are first applied to the registers 34 via an interface unit 35 and an allotting circuit 36. Registers 34 extract the dialing information, process it, and supply it to the central processor 28. The transfer information is supplied by bus THW via an interface 37 and a transfer system 38 to the central processor 28. The information from the external lines is fed to central processor 28 via an allotting circuit 39.

The common control 22 further includes a main clock 40 which supplies the timing pulses to the registers 34 and also to a coded counter 42. Counter 42 controls a decoding matrix 44 to supply pulses, via line 46, to the in-gates of the terminals in the exchange to access them to the common transmission highway HW.

In the arrangement illustrated in FIG. 2, the terminal in-gates are sequentially opened by coded counter 42 in accordance with a fixed sequence of time-slots. However, coded counter 42 could be replaced by a memory to provide a floating system of time-slots allocated by the common control during the operation of the exchange.

Specific time-slots are thus allotted to all the in-gates (excluding the tone gates) for accessing their respective terminals to the common transmission highway HW in accordance with a fixed sequence. The information is extracted from the common transmission highway HW through the out-gates which are operated in accordance with the addresses written in the main memory of the system. For this purpose, main memory 24 controls a decoding matrix 50 to produce pulses on line 51 to the terminal out-gates in accordance with the information written in the main memory.

Auxiliary memory 26, which contains the information concerning the state of the terminals, controls a further decoding matrix 52 which supplies pulses via line 53 to the out-gate of the tone generators 23 for producing the tone signals.

Central processor 28 is a multi-input, multi-output combinational network. As briefly described above, its inputs include the auxiliary memory 26, the registers 34, the signalling information from the signal bus LHW, and the transfer information from the transfer bus THW. Decisions regarding the state of the terminals are made by central processor depending upon the input information.

Briefly, the central processor operates as follows: A subscriber may be in any one of the following states: "Idle," "Dial Tone," "Dialing," "Ringing," "Busy," or "Connected." Transitions from the states occur during the sequence of actions resulting from the establishment of a connection, transfer, or disconnection. For example, transitions from "idle" to "dial tone" occur when a subscriber goes "off-hook." The off-hook information is received by the processor 28 from the registers 34, and the processor then modifies the contents of the auxiliary memory 26 accordingly. After the registers 34 have notified the processor that the first digit has been dialed correctly, the processor changes the contents of the auxiliary memory, thus transferring the subscriber to the "dialing" state. After the remaining digits have been dialed and received at the registers 34, a check is made by the processor 28 of the state of the called subscriber. If the called subscriber is occupied, the calling subscriber becomes "busy." If the called subscriber is "idle," the processor 28 changes its state in the auxiliary memory to "ringing," and that of the calling subscriber to "connected."

The processor 28 also sends writing instructions to the main memory 24 where the addresses of all the terminals are stored. This information is processed to effect a crossing of the addresses and a connection between terminals, as will be described more fully below.

After the called subscriber answers, his state is changed to "connected," and the appropriate release instructions are sent to the associated register 34.

If one of two connected subscribers goes "on-hook," its stage changes to that of "idle," and the associated subscriber is also disconnected and becomes "idle." A request of a "connected" subscriber for a transfer, effected by shorting out one of the line wires, alters the state of the subscriber to "dial tone," and a request to return to his previous state will again put him in "connected state."

The foregoing operation of a time division multiplex system generally is known and is not essential for an understanding of the present invention. The functional supervision of the terminals by the processor 28 may be provided by fixed hard-wired instructions or by software programs, as also well known.

The Conference Connection

As pointed out earlier, in the conventional time division multiplex system, the conferees are directed through the switching network to an analog-multiport circuit in which the talks are combined. One disadvantage of such an arrangement is that it requires a much larger memory since it must have the capacity to record a plurality of addresses with respect to each time-slot. Another disadvantage is that the switching network cannot use sample and hold circuits since the conferee signals cannot be added in the same frame without distortion, and therefore less efficient and/or more complicated speech reconstruction arrangements must be provided.

According to the present invention, means are provided for enabling each conferee to enter the conference in the same way as a usual connection, namely, by cross-addressing in the memory. However, in the system illustrated, only the operator can make the conference connection.

More particularly, a conference link is provided including a plurality of incoming conference lines and a plurality of outgoing conference lines for effecting at least one conference connection between the subscriber links. The switching network includes an in-gate in each incoming conference line and an out-gate in each outgoing conference line, for accessing the lines to the common transmission highway HW. The common control 22 controls the conference in-gates in the same manner it controls the subscriber links, namely by sequentially connecting the incoming conference lines to the common transmission highway in specific time-slots allotted to them. The common control, i.e. its main memory 24, also controls the conference out-gates to connect a called outgoing conference line to the common transmission highway HW in the time-slot of a calling conferee subscriber.

Figure 3:
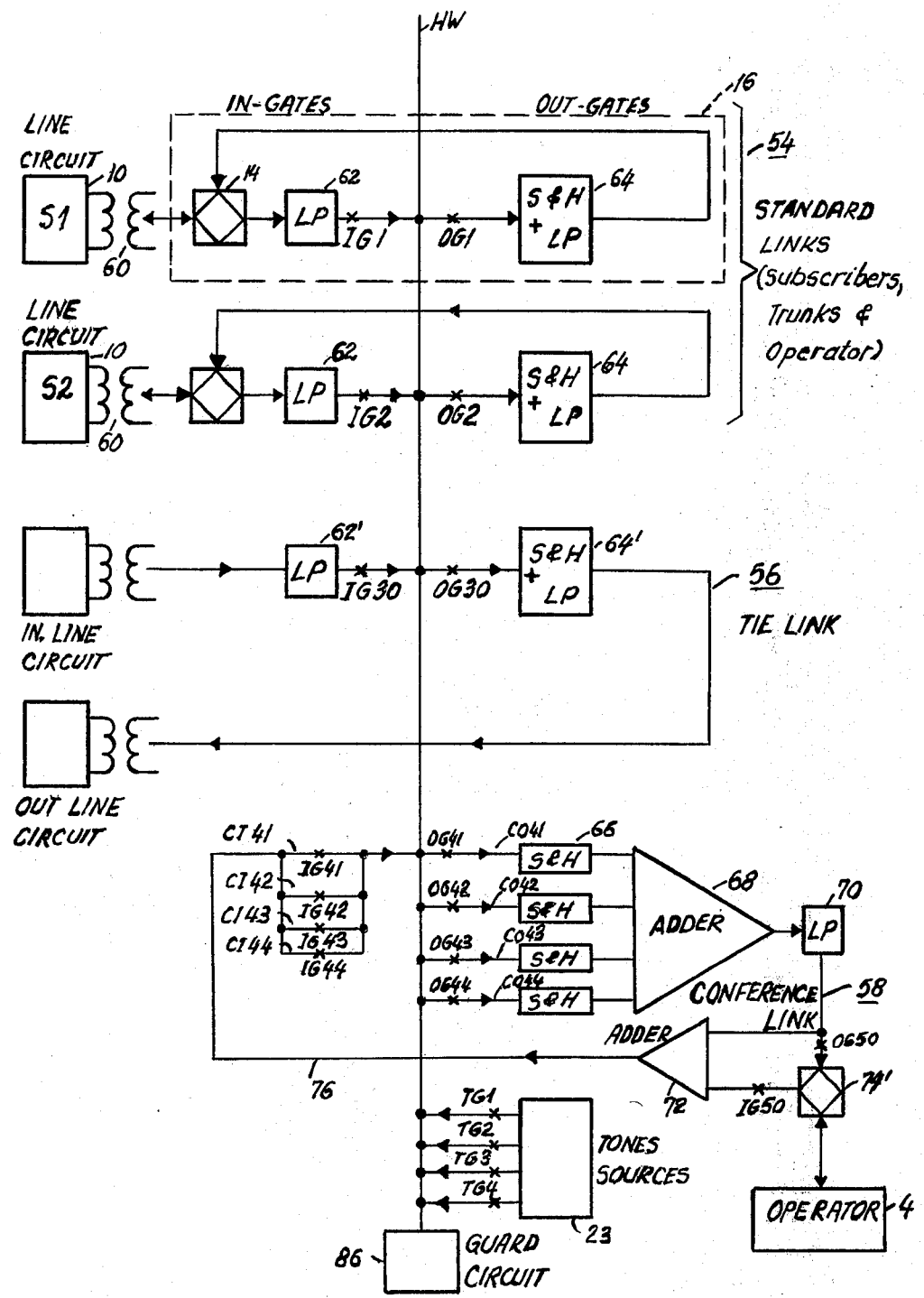
FIG. 3 is a diagram illustrating how the subscriber links and conference lines are provided access to the common transmission highway.

FIG. 3 illustrates, for purposes of example, a standard link 54 (for subscribers, trunks, and the operator), a tie-link 56, and the conference link 58, and how they are provided access to the common transmission highway HW.

With respect to the standard link 54, illustrated in FIG. 3 are the line circuits 10 for two subscribers S1, S2, each subscriber line circuit 10 being connected via its line transformer 60 to the standard link which includes the hybrid circuit 14, and in-gate (IG1, IG2) for enabling the information to flow from the line circuit into the common transmission highway HW, and an out-gate (OG1, OG2) enabling the information to flow from the highway HW to the line circuit via hybrid circuit 14 of the subscriber terminal. The foregoing designation of subscribers S1, S2, as well as their in-gates and out-gates, is based on allocating them to time-slots TS1, TS2, respectively.

The standard link, enclosed by the broken-line box 16, is the same for subscribers, trunks and the operators. Each standard link also includes a low-pass filter 62 between the hybrid circuit 14 and its in-gate, and a sample and hold circuit and a low-pass network 64 between its out-gate and the hybrid circuit.

The filters are operational amplifiers constructed as RC active low-pass filters having about 50 db/octave slope outside the needed range and a special dip in the sampling frequency. The sample and hold circuits are used to improve the signal-to-noise ratio and to construct the sampled information.

The tie link 56 illustrated in FIG. 3 is a 4-wire system with the analog and signaling information passing in one direction only in each pair of wires. The incoming side of the link includes an in-gate, arbitrarily designated IG 30 to indicate that it has been allocated time-slot TS 30, and a low-pass filter $62^1$. The outgoing side of the link includes an out-gate OG 30 and a sample and hold filter and low-pass network $64^1$.

The conference link 58 illustrated in FIG. 3 includes four incoming conference lines (CI41-CI44) each connected by an in-gate IG41-IG44 to the common transmission highway HW, and four outgoing conference lines (CO41-CO44) each connected by an out-gate (OG41-OG44) to the common transmission highway. The above designation of the conference lines, and their in-gates and out-gates, is based on an arbitrary allocation to them of time-slots TS41-TS44. Each outgoing conference line includes a sample and hold circuit 68 for reconstructing the signals transmitted thereto from the common transmission highway through its respective out-gate. The outputs of the sample and hold circuits of all the outgoing conference lines are connected to the input of a common adder 68, the output of the adder being fed through a common low-pass filter 70 to a second adder 72 for adding the operator's signal introduced therein from the operator's hybrid circuit 74. The output of adder 72 is applied via path 76 to the four incoming conference lines.

The tone source 23 are connected by gates TG1-TG4 to the common transmission highway HW. These tone source gates are not operated according to fixed time-slots, as the in-gates of the standard links 54, tie links 56, conference links 58, but rather are operated in accordance with the status of the auxiliary memory 25 via the coding matrix 52 (FIG. 2).

FIG. 3 also illustrates the guard circuit 86 which shorts the common transmission highway during the guard intervals to eliminate cross-talk. As one example, each time-slot could be 2 microseconds duration, which includes a 1 microsecond information interval, and a 1 microsecond guard interval during which the common transmission highway is shorted by the guard circuit. Such guard circuits are known in time division multiplex systems.

Operation of Switching Network Including Conference Connection

The operation of the switching network including the conference connection is as follows:

It is first to be noted that the switching network enables a simultaneous connection in any time-slot of one in-gate to a number of out-gates. In one interval frame, one in-gate can be connected to all out-gates (as in the case of the transmission of signaling tones) without influencing the signal levels at the output of the out-gate. However, one out-gate cannot be connected in one frame to more than one in-gate. That is to say, a sample and hold circuit can receive information in one frame only from one source, since otherwise the signals would be distorted in the respective sample and hold circuit, whether it be a pulse lengther type or a box-car type.

The flow of information from the standard links 54, tie link 56 and conference link 58 into the common transmission highway HW is according to a fixed sequence of time-slots. This sequence is controlled by coded counter 42 via decoding matrix 44 to produce the pulses on line 46 applied to the in-gates. As indicated earlier, the time-slots for the conference link 58 are arbitrarily designated TS41-TS44 in FIG. 3, but it will be appreciated that any otherwise unused time-slots could be allotted to them.

Since the system illustrated contains only a small number of terminals, fixed time-slots are given to all the in-gates, i.e. except the tone signaling gates (TG1-TG4) as noted above. As also indicated earlier, a floating system of time-slots could be used, controlled by the common control, in which case coded counter 42 would be replaced by an additional memory.

All the out-gates are operated in accordance with the address written in the main memory 24 (FIG. 2). All the out-gates (except the time signaling gates) are controlled by the pulses produced from decoding matrix 50 appearing on the output line 51.

The tone signaling gates TG1-TG4 are controlled by pulses produced by decoding matrix 52 from the information written in the auxiliary memory 26, these pulses appearing on output line 53. Only one address can be written with respect to one time-slot in the memory.

Figure 4:
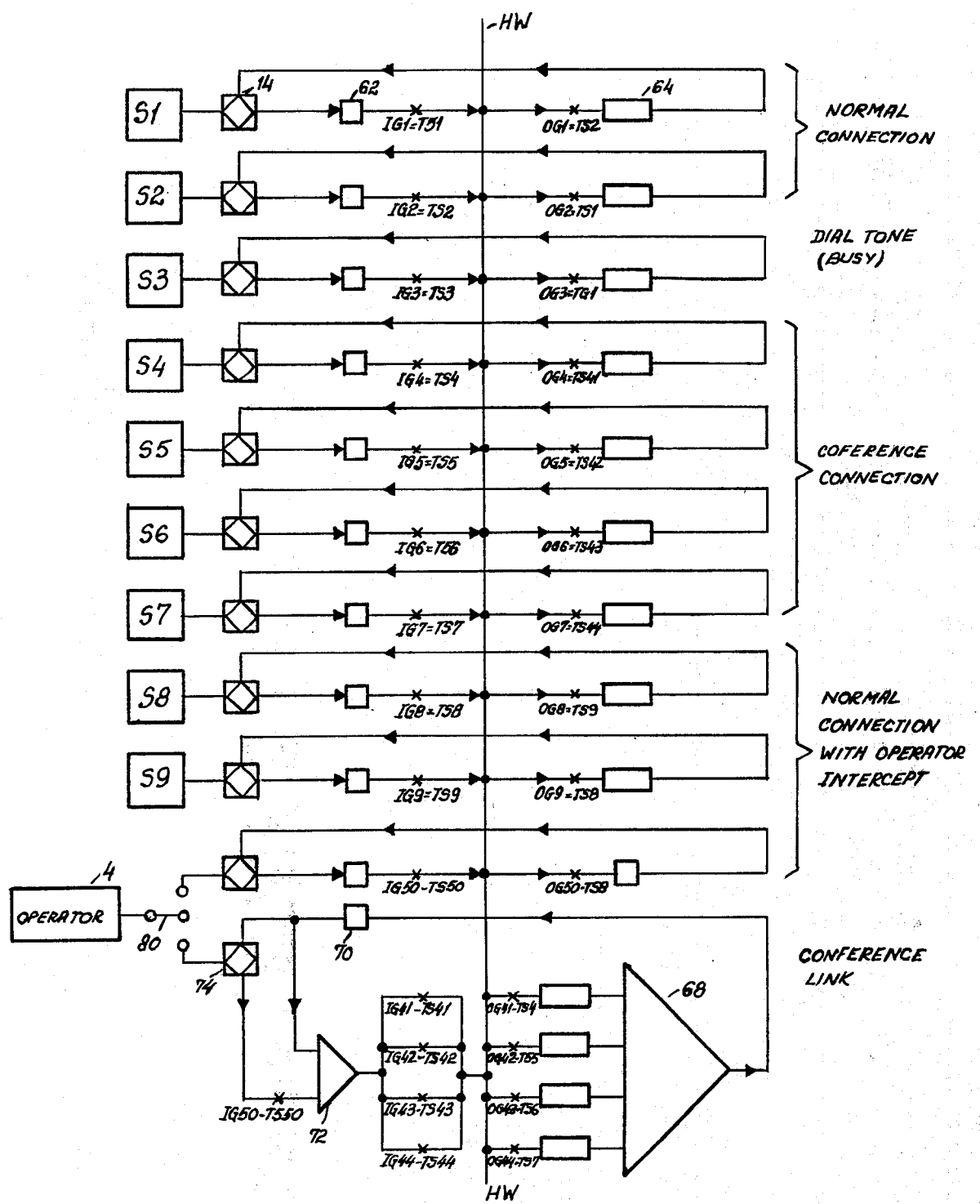
FIG. 4 illustrates for purposes of example one condition of several of the subscriber links and conference lines.

FIG. 4 illustrates the condition of the exchange when subscribers S1 and S2 are in normal connection state, subscriber S3 is in a "busy" state, and subscribers S4-S7 are in a four-party conference connection state. Table 1, below illustrates the corresponding condition of the main and auxiliary memories.

TABLE

| Time-slot | In-gate to which allotted | Address recorded in main memory 24 | Out-gate controlled | Status recorded in auxiliary memory 26 |
|---|---|---|---|---|
| TS1 | IG1 (Subscriber S1) | TS2 | OG2 | connected |
| TS2 | IG2 (Subscriber S2) | TS1 | OG1 | connected |
| TS3 | IG3 (Subscriber S3) | TG1 | TG1 | dial tone(busy) |
| TS4 | IG4 (Subscriber S4) | TS41 | OG41 | connected |
| TS5 | IG5 (Subscriber S5) | TS42 | OG42 | connected |
| TS6 | IG6 (Subscriber S6) | TS43 | OG43 | connected |
| TS7 | IG7 (Subscriber S7) | TS44 | OG44 | connected |
| TS8 | IG8 (Subscriber S8) | TS9 | OG9 | connected |
| TS9 | IG9 (Subscriber S9) | TS8 | OG8 | connected |
| — | — | — | — | — |
| — | — | — | — | — |
| TS41 | IG41 (Conference CI41) | TS4 | OG4 | connected |
| TS42 | IG42 (Conference C142) | TS5 | OG5 | connected |
| TS43 | IG43 (Conference CI43) | TS6 | OG6 | connected |
| TS44 | IG44 (Conference CI44) | TS7 | OG7 | connected |
| — | — | — | — | — |
| — | — | — | — | — |
| TS60 | IG60 (Operator) | TS8 | OG8 | connected |

The normal connection between subscribers S1 and S2 is effected by crossing addresses in the main memory 24. Thus, in time-slot TS1 allotted to subscribers S1, there is recorded the address of subscriber S2, namely its time-slot TS2. Similarly, in time-slot TS2 allotted to subscribers S2, there is recorded the address of subscriber S1, namely its time-slot TS1. Thus, during time-slot TS1 when the in-gate IG1 of subscriber S1 is opened to connect its line to the common transmission highway HW, the outgate OG2 of subscriber S2 is also opened to connect its line to the common transmission highway. Similarly, in time-slot TS2 when the in-gate IG1 of subscriber S2 is opened, the out-gate OG1 of subscriber S1 is also opened. A flow of information thus passes from subscriber S1 to subscriber S2 in time-slot TS1, and from subscriber S2 to S1 in time-slot TS2.

The "connected" status of subscribers S1 and S2 is recorded in the auxiliary memory 26 in the two time-slots TS1, TS2.

Dial and busy tones are passed in the subscriber's own time-slot. This is shown by the condition of the memory with respect to time-slot TS3 allotted to subscriber S3, wherein it will be seen that the address of tone-gate TG1 (allotted to the "busy" tone) is recorded in the main memory 24. The "busy" signal status of subscriber S3 is recorded in the auxiliary memory 26 also in its time-slot TS3.

As will be more fully explained below, the DC level of the dial and busy tone gates is lower than that of the usual gates (but not of the operator's gate) so that the subscriber's in-gate is blocked. Thus, the tone will not be distorted by the sample and hold circuit in the subscriber's link and will not be influenced by the noise or speech in the subscriber's environment. This prevents the development of oscillations in the loop even without lowering the DC level of the tone gate, even though the in-gate and out-gate are connected in the same time slot.

The conference connection is made in the same way as the normal connections, by crossing addresses in the main memory 24. However, only the operator can effect the conference connection, this being schematically illustrated in FIG. 4 by operator switch 80 which enables the conference link 58. The specific manner in which this is accomplished by the operator is more fully explained below with reference to FIGS. 5 and 6.

From FIG. 4 and Table 1, it will be seen that the time-slots TS4-TS7 of subscribers S4-S7 are crossed in the main memory 24 with the time-slots TS41-TS44 of the four conference lines. Thus, in time-slot TS4 allotted to subscriber S4, there is recorded in the main memory the address of out-gate OG41 of outgoing conference line CO41, and the "connected" status is recorded in the auxiliary memory 26; while in time-slot TS41 allotted to conference line IC41, there is recorded the address of out-gate OG4 allotted to subscriber S4, and the "connected" status is recorded in the auxiliary memory. A similar crossing of addresses is effected with respect to subscriber lines S5-S7 and the other conference lines CI42-CI44.

Thus, the four subscribers S4-S7 are connected together via the four conference lines during time-slots TS4-TS7 and TS41-TS44.

The signals leaving the common transmission highway HW during this conference connection are reconstructed in the sample and hold circuits 66 and are then added together in adder 68. The added signals pass through the single low-pass filter 70 and from there return, without distortion, to the operator's hybrid circuit 74. The operator's signal is added through hybrid circuit 74 and adder 72 before being introduced via path 76 to the incoming conference lines.

Each conferee increases the possibility of oscillation in the system as there may be leakage through the hybrid circuits. Also, each conferee increases the gain of the conference loop. The number of the conferees is therefore limited in accordance with the possible range in line impedance and the permitted transmission loss between the conferees. A practical limit is four conference lines.

Operator's Intercept

The system illustrated also enables the operator to intercept an internal subscriber even if he is connected to another. This is also shown in the diagram of FIG. 4, with reference to time-slots TS8 and TS9 allotted to subscribers S8 and S9, and time-slot TS50 arbitrarily allotted to the operator; the condition of the memory for this operation is also illustrated in Table 1.

Thus, as shown in FIG. 4 and Table 1, subscribers S8 and S9 (time-slots TS8, TS9), are cross-addressed in the main memory as in a normal connection, but in the operator's time-slot TS50, the address of subscriber S8 (TS8) is recorded in the main memory. The operator will thus be connected to subscriber S8 in time-slots TS8 and TS50.

As can be seen from Table 1, subscriber S8 is not disconnected from subscriber S9 during this operator's intercept, but rather the connection remains. Instead, the operator's signal overrides that of subscriber S9, this being effected by maintaining the DC level of the operator's in-gate IG50 lower than the other usual in-gates, as will be described more fully below. The communication between subscriber S8 and the operator will be in the normal signal levels, and subscriber S9 will also hear subscriber S8 at a normal level. Subscriber S8 will also hear subscriber S9, but at a much lower level, since subscriber S9 is not disconnected or blocked. Because of leakage through the hybrid circuits, subscriber S9 and the operator will also hear each other, but again at a very low level.

Such an arrangement, where subscriber S9 hears subscriber S8 and the operator during the operator's intercept, is desirable since otherwise subscriber S9 may feel he was disconnected and may therefore on-hook. Another advantage of the foregoing arrangement is that the addresses in the main memory are not changed on operator intercept, and when the operator intercept is terminated the connection returns to normal while erasing only the address in the operator's in-gate time-slot.

The specific manner of providing this overriding arrangement during the operator's intercept is described below with reference to the construction of the transmission gates.

Operator Set-up of Conference Connection

As mentioned earlier, and as indicated schematically by manual switch 80 in FIG. 4, only the operator can set-up the conference connection. The system for accomplishing this, which is located in the operator's console, is illustrated in FIGS. 5 and 6.

It will be recalled from the earlier description that during the off-hook and dialing condition of a subscriber terminal, a line signal is produced on bus LHW for the respective subscriber line, this signal being applied to the registers 34 (FIG. 2) which extract the dialing information, process it and supply it to the central processor 28. The foregoing applies with respect to all the subscriber lines, but does not apply with respect to the conference lines CI41-CI44 (FIG. 3). Only the operator can dial "in the name of" the conference lines CI41-CI44, but from there on the dialing information is processed by the system, particularly the common control 22, in the same manner as it processes the information when dialed by a subscriber.

Figure 5:
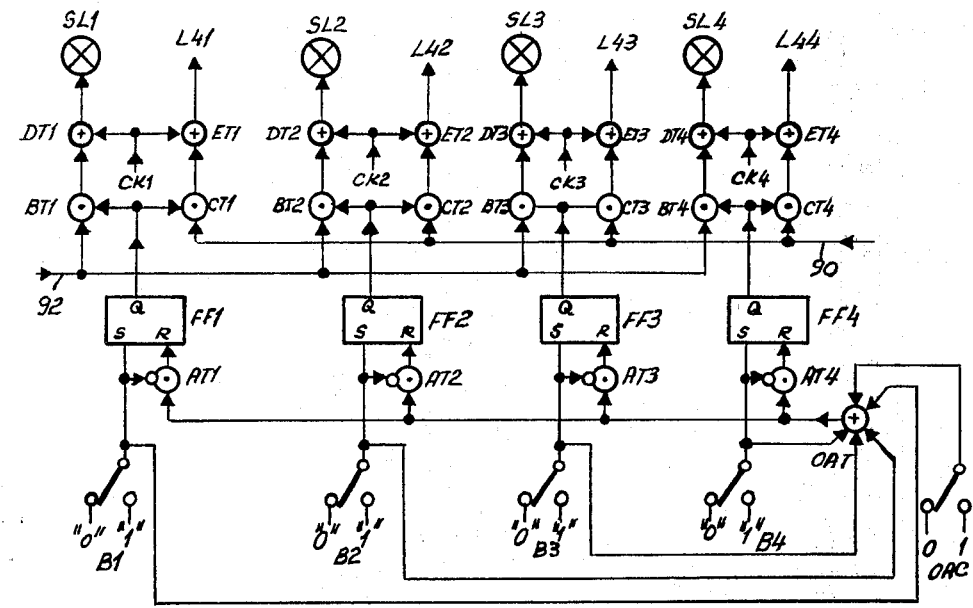
FIGS. 5 and 6 are diagrams illustrating how the operator controls the setting-up of a conference connection.
Figure 6:
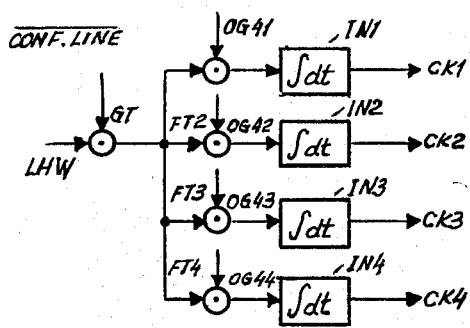

As shown in FIG. 5, the operator's console includes an "arrange conference" switch OAC which is normally in the 0, or inactive position. When the operator desires to set-up a conference, he moves the switch to the 1 or active position. Switch OAC is connected to an OR-gate OAT, which supplies a 1 output whenever switch OAC has been actuated to set-up a conference.

The operator's console also includes four operator buttons 81-84 each providing the operator with access to one of the conference lines CI41-CI44. Further included in the operator's console are four signal lamps SL1-SL4 which provide an indication of the condition of each of the conference lines, as to be described below.

The operator's off-hook and dialing signal appears on line 90 in FIG. 5. On line 92 in FIG. 5 appears a varying voltage which is used to produce a flickering signal on signal lamp SL1-SL4 as to be described below.

The operator sets-up a conference in the following manner:

First, the operator actuates the "arrange conference" switch OAC to its 1 position, this producing a 1 output from OR-gate OAT as mentioned earlier. In addition, the operator actuates one of the conference line buttons (e.g. B1) to its 1 position, and then dials the number of the subscriber to be connected to the corresponding conference line (e.g. CI41). Button B1 is of the type that, when depressed, it makes a momentary contact and then returns to its normal inactive state. Therefore, when button B1 is depressed by the operator, a 1 is applied to flip-flop FF1, which is thereby put in its "set" state to produce a 1 output. The flip-flop remains in this state even when the conference button B1 returns to its normal B condition upon release by the operator.

A 1 output from flip-flop FF1 is applied to two AND-gates BT1, CT1. The flickering voltage signal on line 92 is therefore applied via OR-gate OT1 to signal lamp SL1, the latter lamp producing a flickering light indicating this condition. In addition, the operator off-hook and dialing signal on line 90 is passed via AND-gate CT1, OR-gate ET1, and line L41 to the common control where it is processed as if it had been dialed by the incoming conference line CI41.

In other words, by depressing conference button B1, the operator acts for conference line CI41, and dials "in its name" the line of the subscriber to be connected to that conference line. The common control 22 processes the dialing information as if it came from conference line CI41, making the connection in the same manner as when a regular subscriber dialed, including cross-addressing its address (time-slot) with that of the dialed subscriber to participate in the conference.

When the dialed subscriber (e.g. 54 in FIG. 4 and Table 1) off-hooks, a continuous signal is applied to OR-gates DT1 and ET1 from CK1, in the manner to be described below with respect to FIG. 6. The continuous signal on OR-gate DT1 causes lamp SL1 to provide a continous light, thereby indicating that the connection of subscriber S4 to conference line CI41 has been completed. The continuous signal applied to OR-gate ET1 establishes a holding signal for line L41, which holding circuit is disconnected only when that conferee subscriber on-hooks, which terminates the continuous signal CK1.

When the second conferee subscriber is to be connected to the conference link, the operator depresses the second conference button B2, which sets its flip-flop FF2 to 1. At the same time, all the other flip-flops (FF1, FF3, FF4) are reset to 0 by means of OR-gate OAT and the OR-gates AT1, AT3, AT4 for the respective flip-flops. Thus, flip-flop FF1 resets back to 0, but circuit CK1 holds the signal on line L41, this circuit being maintained, as described above, until the subscriber on conference line CI41 hooks-on, which terminates the CK1 signal.

The other subscribers to participate in the conference are connected in the same manner, namely by the operator depressing the respective conference button (e.g. B3), and then dialing the address of the subscriber to be connected to that conference line.

FIG. 6 illustrates how the CK1-CK4 signals used for holding the connections to the conference lines L1-L4 are produced and terminated.

As will be recalled from the description of FIG. 2, LHW is the digital bus on which appear all the line signals from all the subscribers when in the off-hook or dialing condition. These signals pass through an AND-gate GT (whose function is described below) and are applied to four further AND-gates FT1-FT4. Each of the latter AND-gates includes, as a second input, the signals from the main memory applied to the out-gates OG41-OG44 of the outgoing conference lines GO41-GO44. Thus, AND-gates FT1-FT4 extract, from all the line signals on bus LHW, those signals applicable to the selected conferees. The outputs of gates FT1-FT4 are a series of pulses, these being integrated in the respective integrating circuits IN1-IN4 to produce the continuous signals CK1-CK4.

The signals on lines CK1-CK4 thus constitute a reconstruction of the DC signals of the respective conferees containing the off-hook and dialing signals. Accordingly, if the conferee on-hooks, the respective signal CK1-CK4 will terminate. As noted above from the description of FIG. 5, the CK1-CK4 signals are used to hold the subscribers connected on the conference line, and therefore when a signal CK1-CK4 terminates, the respective subscriber automatically becomes disconnected from the conference line.

Should, by some malfunction of the system, the memory content two conference lines together, there would be no way of disconnecting them. Therefore, AND-gate GT is provided and receives, as one input, the signals on the LHW bus, and as another input, the inverted signals from time-slots 41-44 allotted to the incoming conference line IG41-IG44. Therefore, AND-gate GT assures that no conference line can be connected to another conference line.

The Transmission Gates

As indicated earlier, the in-gate of the operator and the in-gate of the tone generators are maintained at different DC level with respect to the in-gates of the subscriber lines and of the conference lines so that the signal from the operator will override all the other signals, and the signal from the tone generators will override those of the subscriber lines and of the conference lines, without actually disconnecting these lines. This is produced by a "minimum gate" arrangement for the in-gates, whereby if more than one in-gate is opened simultaneously, only the in-gate with the lowest DC signal will in effect be connected to the highway. The operator's in-gate IG50 carries the lowest DC signal, those of the tone generators carry a higher DC signal, and those of the subscriber lines and conference lines carry the highest DC signal.

Figure 7:
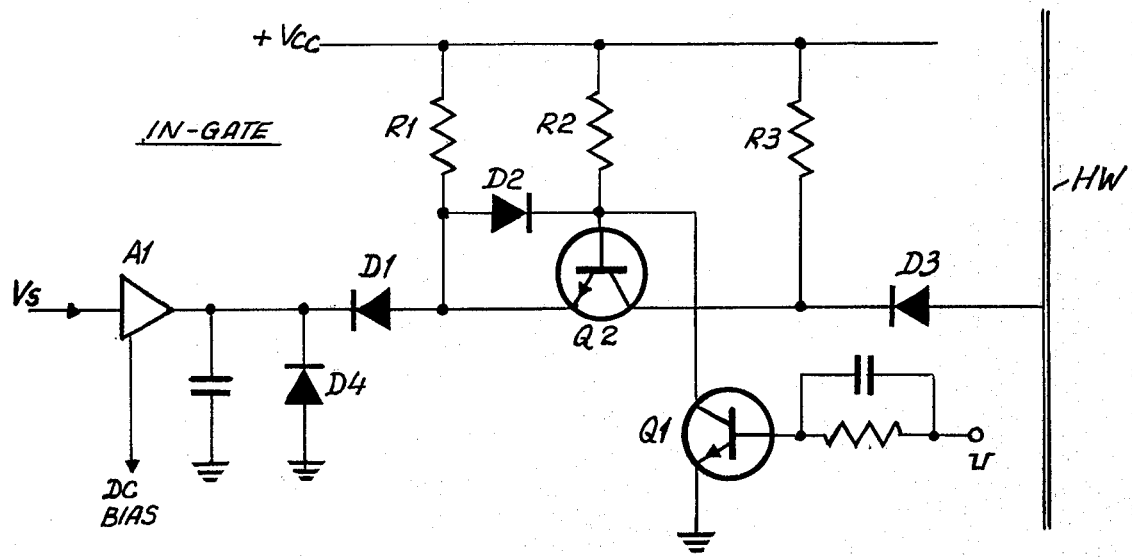
FIG. 7 illustrates an in-gate used in the system.

The construction of an in-gate is illustrated in FIG. 7. There is one in-gate for each subscriber line, one for each conference line (four in this case), one for each of the tone generators (four in this case), and one for the operator. All the in-gates are of the same structure, as shown in FIG. 5, except they carry different DC levels, as mentioned above, to provide the override feature as described more fully below.

Each in-gate includes two transistors Q1 and Q2. The base of transistor Q1 receives the gating signal from decoding matrix 44 (FIG. 2), except those for the tone generators receive their gating signals from decoding matrix 52 as mentioned earlier. The emitter of transistor Q1 is grounded, and its collector is coupled to the base of transistor Q2. The emitter of transistor Q2 receives the audio signal via amplifier A1 and diode D1. A second diode D2 is connected between the emitter and base of transistor Q2, and the collector of transistor Q2 is connected via diode D3 to the common transmission highway HW.

The in-gate of FIG. 7 operates as follows: In the absence of a gating pulse applied to the base of transistor Q1 (from decoding matrix 44 or 52, FIG. 2), transistor Q1 is in saturation, and current passes through diode D2, whereby transistor Q2 is cut-off. Diode D1 is cut-off. Thus, the audio signal applied to the input of amplifier A1 cannot pass to the common transmission highway HW.

When the base of transistor Q1 receives a gating pulse from the respective decoding matrix, transistor Q1 is cut-off, thereby making the base of transistor Q2 more positive, whereby transistor Q2 conducts. The current through resistor R2 assures that transistor Q2 saturates. Diodes D1 and D3 are opened, whereas diode D2 is cut-off. Opening diode D3 clamps highway HW to the input audio signal Vs, whereby the input audio signal Vs is passed to the common transmission highway HW.

The voltage on diode D2 assures that transistor Q2 will be cut-off when no gate pulse is applied to transistor Q1. Diode D4 is provided between amplifier A1 and coupling diode D1, and assures that the emitter of transistor Q2 will not go negative; this prevents parasitic oscillations which might otherwise appear when there is a connection.

All the in-gates are constructed as illustrated in FIG. 7, except that their respective input amplifiers A1 are biased at different DC levels, to provide a different bias on their respective diode D3. This connection of the gate to the highway HW through diode D3 provides a "minimum gate" to the highway so that if more than one gate is opened simultaneously, only the gate with the lowest signal will be effectively connected to the highway. The other gates will in effect be cut-off. Thus, diode D3 of in-gate IG50 for the operator is biased at the lowest DC level, so that if it is opened coincidentally with that of a tone generator gate, subscriber line gate, or conference line gate, the operator's in-gate will override all the others. The DC level of the tone generator in-gates TG1-TG4 (FIG. 3) is higher than that of the operator's in-gate, but lower than that of the in-gates for the subscriber lines and conference lines, so that opening of a tone generator in-gate will override the simultaneously opened in-gate of a subscriber line or conference line.

As mentioned earlier, all the in-gates are opened by pulses from decoding matrix 44 (via line 46), except that the tone generator gates are opened by pulses from decoding matrix 52 (via line 53).

As also mentioned earlier, the foregoing arrangement provides a number of advantages. First, it assures that the connection of the operator's line to the common transmission highway will override the connection of the subscriber lines. Thus, a subscriber's line need not be disconnected during an operator's intercept, and the overridden subscriber can still hear the other parties on the line, but very weakly, so that he is aware he is still connected to the line.

This arrangement further simplifies the control system, since no special orders are required to be generated to disconnect the other party. As soon as the operator's intercept is completed, and the operator's connection is broken, the existing connection of the subscriber is automatically resumed with no special instructions or control being required.

Further, providing the intermediate DC level for the tone generator in-gates assures that the tones will not be distorted by the sample and hold circuits of the subscriber lines, and also that the tones will not be influenced by the noise or speech in the subscriber's environment. In the "dial" and "busy" tone conditions, the tone generator gate is opened in the same time-slot as the in-gate for the respective subscriber line. Thus, there are two signals being transmitted from two separate sources, i.e., the environmental signal from the subscriber's line, and the tone signal from the tone generator. The "minimum gate" arrangement described above thus assures that the tone signal will override the extraneous audio signals from the subscriber's line, and will not be distorted.

Another advantage of this arrangement is that the same time-slot of the subscriber line can be used for the dial tone and busy tone signals without using special time-slots for such tones.

As one example, the DC level of the in-gates of the subscriber's lines and conference lines may be +4 volts, the DC level of the dial and busy tone generators may be +2 volts, and the DC level of the operator's in-gate may be +1 volt.

Figure 8:
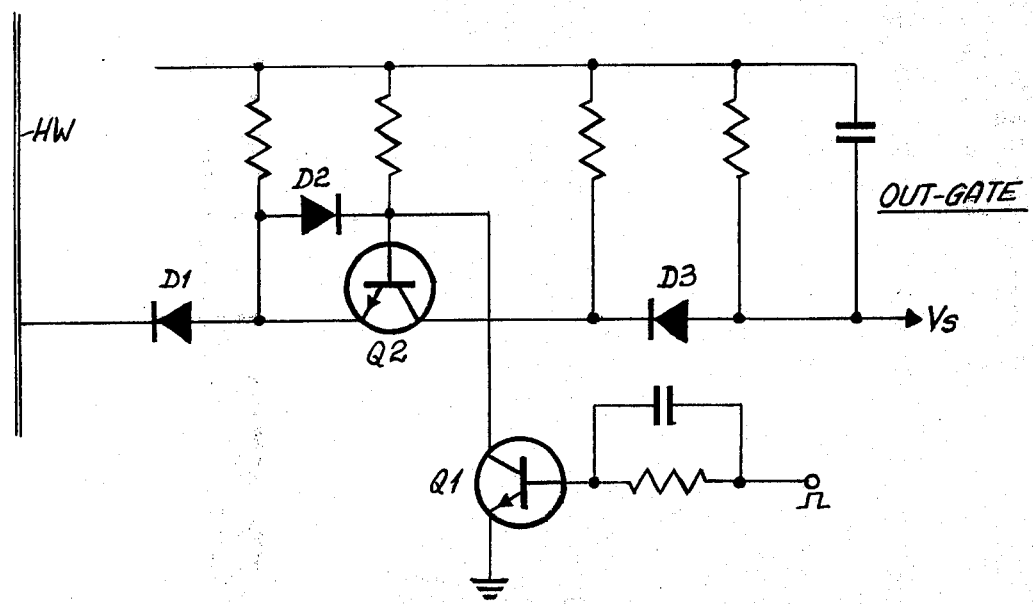
FIG. 8 illustrates an out-gate used in the system.

The construction of the out-gates is shown in FIG. 8. In the described system, there is an out-gate for each of the subscriber's lines, trunk and operator, and an out-gate for each of the four conference lines. These out-gates connect the common transmission highway HW to the sample and hold network of each individual line, and therefore there is a sample and hold circuit for each out-gate.

As shown in FIG. 8, the construction of the out-gate is substantially the same as the in-gate (and therefore the elements are correspondingly numbered, but with a "prime" notation), except that diode D4 is omitted since the highway cannot go negative. Also, the biased amplifier A1 is omitted, so that the out-gates do not have the foregoing overriding feature of the in-gates, nor is such feature necessary for the out-gates. Usually, but not necessarily always, only one out-gate is opened in the same time-slot so that the highway HW will be connected to only one sample and hold circuit at any one time.

Many variations will be apparent. For example, a floating system of time-slots could be used instead of a fixed system for opening the in-gates. In addition, the common control could include a programmable computer instead of the fixed wiring system illustrated, as also indicated earlier. Larger systems could include a plurality of common transmission highways instead of the one used in the above-described system.

Many other versions, modifications and applications of the illustrated embodiment will be apparent.

What is claimed is:

1. A time division multiplex system including a plurality of subscriber links each for connection to a subscriber line, the subscriber links including a switching network having an in-gate and an out-gate for each subscriber line for accessing it to a common transmission highway, and a common control for controlling the in-gates to sequentially connect a calling subscriber link to the common transmission highway in time-slots allotted to the called subscriber links and for controlling the out-gates to connect a called subscriber link to the common transmission highway in the time-slot of the calling subscriber, the improvement wherein the system further includes a conference link to the common transmission highway, the conference link including a plurality of incoming conference lines and a plurality of outgoing conference lines for effecting at least one conference connection between a plurality of the subscriber lines, a switching network including an in-gate in each incoming conference line and an out-gate in each outgoing conference line for accessing the lines to the common transmission highway, the common control including means for controlling the conference in-gates for sequentially connecting the incoming conference lines to the common transmission highway in specific time-slots allotted to them, and controlling the conference out-gates to connect a called outgoing conference line to the common transmission highway in the time-slot of a calling conferee subscriber, said means for controlling being comprised of a cyclic memory and means for recording therein the address of the called subscriber link or outgoing conference line in relation to the time-slot of the calling subscriber, and for recording therein the address of the calling subscriber link in relation to the time-slot of the called subscriber line or incoming conference line.

2. The system according to claim 1, wherein each outgoing conference line includes a sample and hold circuit coupled to the out-gate therein for reconstructing the signals transmitted thereto from the common transmission highway.

3. The system according to claim 2, including a common adder to which the outputs of the sample and hold circuits of all the outgoing conference lines are coupled, and a common low-pass filter, said common adder having an output the output of the adder coupled to said low-pass filter, and said low-pass filter having an output coupled to the incoming lines of the conference link.

4. The system according to claim 1, including an operator console having a conference switch manually actuatable by an operator to establish a conference connection between a plurality of subscriber links and the conference link, a line switch for each of the incoming conference lines and manually actuatable by the operator to enable the incoming conference line, and means controlled by the operator for enabling the common control to connect a calling subscriber link to a selected incoming conference line.

5. The system according to claim 4, further including an operator in-gate for providing access of the operator's line to the common transmission highway, tone sources and tone source in-gates for operatively coupling said tone sources to the common transmission highway, and override means for enabling said operator in-gates to override the in-gate of the subscriber links and the conference lines without disconnecting the latter, said override means having means for enabling the in-gates of the tone sources to override the in-gates of the subscriber links and of the conference lines and wherein said subscriber and conference in-gates, said tone source in-gates and said operator in-gates are maintained at different DC voltage levels, the DC voltage levels of the subscriber links and of the conference lines being at one extreme value, that of the operator's line being at the opposite extreme value, and that of the tone sources being between the two extreme values.

6. The system according to claim 4, wherein said operator's console includes a signal lamp for each incoming conference line, said system further including a source of varying voltage and means connecting said varying voltage to each signal lamp to produce a flickering light signal when its incoming conference line is enabled by the operator, a source of continuous voltage, and means connecting said continuous voltage to each signal lamp to produce a continuous light signal when its incoming conference line is connected by the operator and the common control to a subscriber link.

7. A time division multiplex system including a plurality of subscriber links each for connection to a subscriber line, the subscriber links including a switching network having an in-gate and an out-gate for each subscriber line for accessing the respective subscriber line to a common transmission highway, a common control for controlling the subscriber line in-gates to sequentially connect the calling subscriber links to the common transmission highway in time-slots allotted to the subscriber links, and for controlling the out-gates to connect a called subscriber link to the common transmission highway in the time-slot of the calling subscriber; an operator line; an operator in-gate for providing access of the operator line to the common transmission highway; a tone source; and a tone source in-gate for providing access of the tone source to the common transmission highway; said in-gates being maintained at different DC voltage levels, the DC voltage level of the subscriber links being at one extreme value, that of the operator line being at the other extreme value and that of the tone source being between the two extreme values whereby in the event of simultaneous opening of a plurality of said in-gates the voltage level of the operator line is effective to override the other lines, and that of the tone source is effective to override a subscriber link.

* * * * *